United States Patent [19]

Friberg

[11] 4,257,000

[45] Mar. 17, 1981

[54] APPARATUS FOR CONTROLLING THE LENGTH OF MOVEMENT OF A CONTROLLED MEMBER ALONG A PATH OF REPEATED OPERATING POSITIONS

[75] Inventor: Richard L. Friberg, Waynesboro, Va.

[73] Assignee: General Electric Company, Salem, Va.

[21] Appl. No.: 35,134

[22] Filed: May 1, 1979

[51] Int. Cl.³ .......................................... G05B 19/25
[52] U.S. Cl. .................... 318/573; 318/570; 318/571; 318/574; 318/603; 83/916; 83/558; 364/702
[58] Field of Search ............... 318/570, 571, 573, 574, 318/603, 606; 83/916, 556, 558; 364/702

[56] References Cited

U.S. PATENT DOCUMENTS

| | | | |
|---|---|---|---|
| 3,287,545 | 11/1966 | Burnett et al. | 318/573 |
| 3,664,217 | 5/1972 | Schiewek et al. | 83/916 |
| 3,934,130 | 1/1976 | Friberg | 364/702 |
| 3,969,615 | 7/1976 | Bowers et al. | 318/574 |

Primary Examiner—J. V. Truhe
Assistant Examiner—Eugene S. Indyk
Attorney, Agent, or Firm—James H. Beusse; Walter C. Bernkopf

[57] ABSTRACT

An apparatus for controlling the length of movement of a controlled member along a path of repeated operating positions. The apparatus comprises a function generator with an axis digital integrator for each axis of movement of the controlled member and a resultant length of movement digital integrator. All digital integrators have the same input iterate rate. By initially setting the integrand of the resultant length of movement integrator to the square root of the sum of the squares of the initial integrand values of the axis digital integrators of the function generator, the output of the resultant length of movement digital integrator is proportional to the resultant of the distances commanded along the axes by the axis integrators of the function generator. A counter is set to the incremental distance between repeated operating positions and is counted down by the output of the resultant length of movement digital integrator. The controlled member is stopped when the incremental distance between repeated operating positions has been reached. After the work is completed at the operating position the counter is again set to the incremental distance between operating positions and the controlled member is moved to the next operating position.

10 Claims, 3 Drawing Figures

APPARATUS FOR CONTROLLING THE LENGTH OF MOVEMENT OF A CONTROLLED MEMBER ALONG A PATH OF REPEATED OPERATING POSITIONS

BACKGROUND OF THE INVENTION

This invention relates to an apparatus for controlling the length of movement of a controlled member along a path of repeated operating positions in a numerical control system.

In machine tools of the type controlled by numerical controlled systems, generally described in U.S. Pat. No. 3,657,525 entitled "Direct Feed Rate Control Circuit" and assigned to the same assignee as the present invention, it is often necessary to control accurately the length of movement of a controlled member such as a cutting tool and/or work piece, between repeated operating positions. Operations that can be performed at the operating positions can be punching, drilling, spot-welding, or other operations.

In U.S. Pat. No. 3,657,525, the circuit used to determine when incremental distance along a path of repeated operating positions has been reached is the Vector Approximation Circuit (V.A.C.). The V.A.C. operates by dynamically taking the square root of the sum of the squares of two changing numbers which constitute position change commands per unit of time for the X and Y axis.

The result of these dynamic calculations by the V.A.C. is used to count down a counter that has stored in it the incremental distance between operating positions. The calculations made by the V.A.C. can be inaccurate because of the practical requirement of having to truncate continuing fractions in order that the square root of the sum of two squares can be continually performed as the changing numbers from the function generator are received. When, for example, a V.A.C. is used in a "nibbling operation" (I.E. where a punch press makes successive punches in close proximity to one another, such as every 1/10 of an inch) the accumulated error in measuring the incremental distance between successive operating positions can sometimes cause the last punch of a series of punches to strike a sliver of material resulting in harmful forces on the punching tool. In order to avoid punching slivers, additional circuitry is required.

It is an object of the present invention to improve the accuracy with which the length of movement along a path of repeated operations can be measured.

Another object of the present invention is to provide a new and improved numerically controlled machine adapted for "nibbling" machining operations.

Still another object of the present invention is to provide a new and improved circuit adapted for controlling the length of movement of a control member along a path of repeated operating positions and effective for adapting existing numerically controlled machines equipped with three axes controls for "nibbling" machining operations.

SUMMARY OF THE INVENTION

One form of the present invention comprises a function generator having an axis digital integrator for each axis of movement of the controlled member. The input to the axis digital integrator is an iterate command from a source of clock pulses. The output of each of the axis digital integrators provides an axis rate command. The axis rate command is equal to position change command pulses per unit of time. There is also provided a resultant length of movement digital integrator having the same iterative command input as the axis digital integrators with an integrand equal to the square root of the sum of the squares of the initial values of the integrands of the axis digital integrators. The output of the resultant length of movement digital integrator is proportional to the distance travelled along the resultant path of the axis positions commanded by the axis integrators. The degree of resolution of the length of movement digital integrator is equal to the degree of resolution from the axis integrators. The output of the resultant length of movement digital integrator is used to determine the point at which the required distance between repeated operating positions has been reached. When the desired distance has been reached the iterate commands of the axis digital integrators and the resultant length of movement digital integrator are stopped.

DESCRIPTION OF THE DRAWING

While the specification concludes with claims particularly pointing out and distinctly claiming the present invention, the objects and advantages of the invention can be more readily ascertained from the following description of a preferred embodiment when read in conjunction with the accompanying drawing in which:

DESCRIPTION OF THE PREFERRED EMBODIMENT

Figure 1:
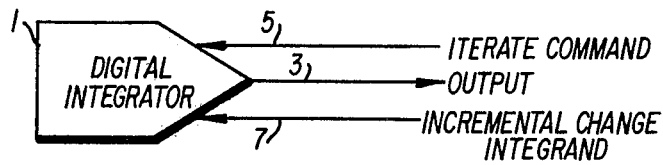
FIG. 1 is a symbolic illustration of a digital integrator.

FIG. 1 is a symbolic illustration of a digital integrator 1 of a type used for various purposes in the hereinafter described embodiment of the present invention. This digital integrator, sometimes also referred to as a differential analyzer, is described in detail in U.S. Pat. No. 3,934,130-Friberg, assigned to the same assignee as the present invention, and the description contained therein is incorporated by reference. Variables for use with such digital integrators are represented by pulse trains in which each pulse represents an incremental change in the represented variable. An output pulse rate on terminal 3 in the illustration of FIG. 1 is equal to a variable integrand times the repetition rate of an iterate rate at terminal 5 divided by a modulus, $$\text{or output rate} = \left(\frac{\text{iterate rate} \times \text{(integrand)}}{\text{modulus}}\right).$$

The modulus may be a number which depends on the base of the arithmetic number system employed and the number of stages of the remainder register and is greater than or equal to one. When the integrand is constant, which occurs when there is no input at the incremental change to the integrand at terminal 7 to change the predetermined value to which the integrand was set by means of a punched tape or other external source, the output rate at terminal 3 is equal to the constant integrand times the iterate rate at terminal 5 divided by the modulus.

Figure 2:
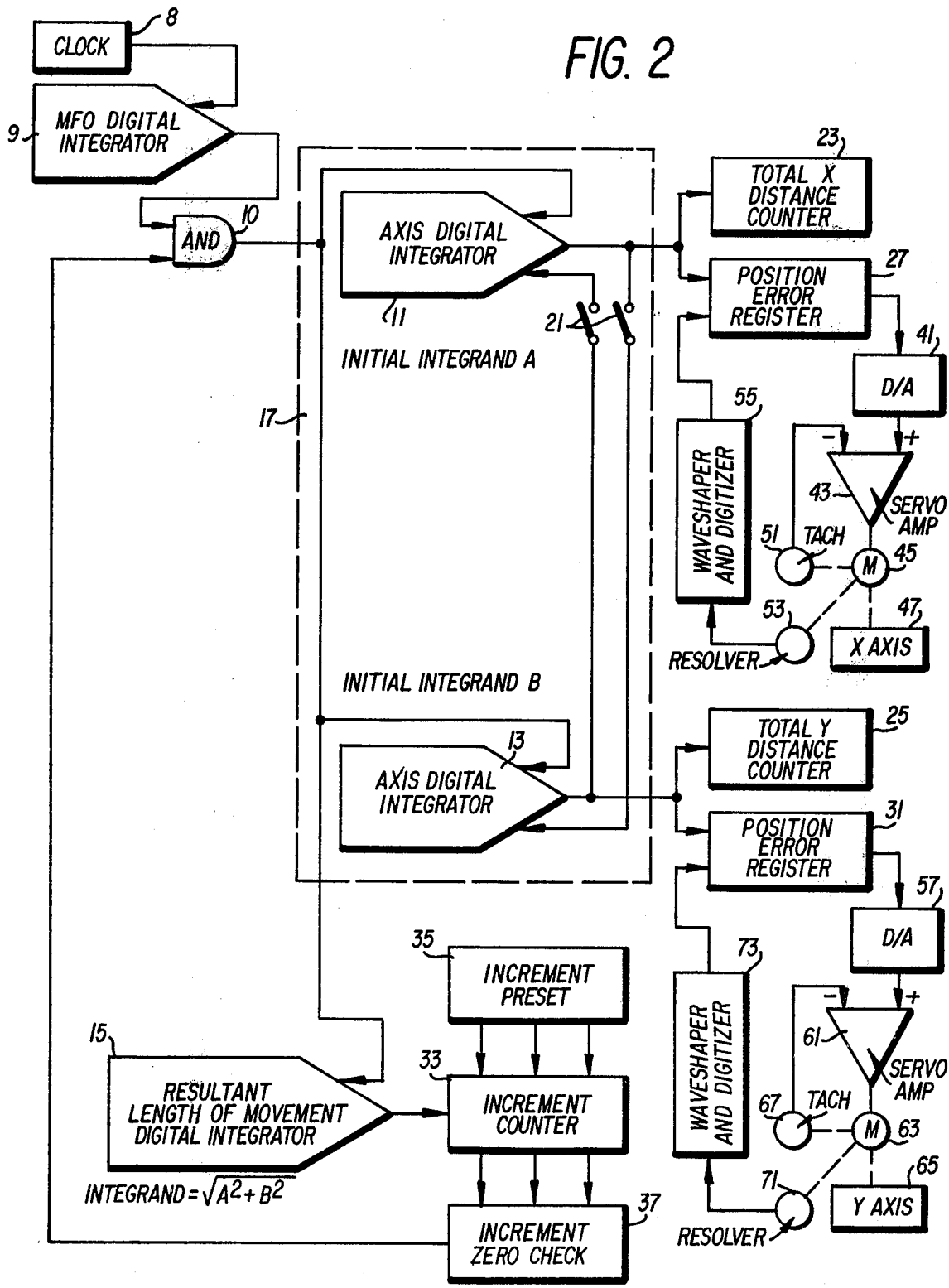
FIG. 2 is a schematic illustration of an apparatus shown in block form for controlling the length of movement of the controlled member along a path of repeated operating positions.

FIG. 2 discloses an apparatus for controlling the length of movement of a controlled member along a path of repeated operating positions. Assume the controlled member is part of a machine tool that has two orthogonal axes x and y along which the controlled member can move. A clock 8 provides an iterate command input to manual feed - rate override (MFO) digital integrator 9. The output from MFO integrator 9 provides an iterate command for the rest of the apparatus. Additionally, the output of the MFO integrator 9, which is a pulse rate, is less than or equal to the clock rate of clock 8. Furthermore, the output of MFO integrator 9 is adjusted prior to the operation of the circuit by preselecting the value of the MFO integrand. As explained in reference to FIG. 1 the output of a $$\text{digital integrator} = \frac{\text{(iterate rate) (integrand)}}{\text{modulus}}.$$

The output of MFO integrator 9 therefore is proportional to the clock 8 rate. The output of the MFO integrator is connected to an input of an AND gate 10 and when the other input to AND gate 10 is high the iterate command signal is applied simultaneously to the axis integrators 11 and 13 of the function generator 17 and to the resultant length of movement integrator 15, all of which integrators 11, 13 and 15 are in parallel. Therefore the output of the MFO integrator 9 is the iterate command for integrators 11, 13 and 15.

The axis integrators 11 and 13 and the connections therebetween cooperate to form a function generator 17. When the switch 21 is in the open position as shown in FIG. 2 and the integrands of axis integrators 11 and 13 are set to the total X distance to go and the total Y distance to go respectively (the total X distance to go is the total distance to be commanded along the x axis, likewise the total Y distance to go is the total distance to be commanded along the y axis) the outputs of the axis integrators 11 and 13 are the linear components of a slope. The mentioned total X and Y distances to go are each obtained from a punched tape or other external source. The output of each axis integrator 11 and 13 is proportional to the iterate rate times the value of its integrand. The output of each of the axis integrators 11 and 13 constitutes axis position change commands per unit of time or axis velocity commands. Thus each output pulse of the output pulse train represents an incremental distance of motion commanded along its corresponding axis. As discussed with reference to FIG. 1, output of $$\text{axis integrator 11} = \frac{\text{(iterate rate) (X integrand)}}{\text{modulus}}$$

and Output of $$\text{axis integrator 13} = \frac{\text{(iterate rate) (Y integrand)}}{\text{modulus}}.$$

When the switch 21 is in the closed position, the axis integrators 11 and 13 are cross tied, that is, the output of each axis integrator 11, 13 serves as the incremental change integrand signal to the other. The integrands of each axis integrator 11 and 13 are initially set to a predetermined initial X and Y arc center offsets measured from the starting point of the arc. The arc center offset values are obtained from a punch tape or other external source. The output of one of the axis integrators 11, 13 is the sine component and the output of the other is the cosine component of an arc.

A total X distance counter 23 is set to the total number of position change pulses to be generated in order to command movement along the x axis or in other words the total X distance to go. This total X distance is obtained from a punched tape or other external source.

Similarly, a total Y distance counter 25 is set to the total number of position change pulses to be generated in order to command movement along the y axis.

The two total distance counters 23 and 25 are each counted down by the output of a respective axis integrator 11, 13.

The output of the axis integrator 11 is connected to a position error register 27 which is an up/down counter. The axis rate command from axis integrator 11 generates the command to the servo motor 45 by causing the position error register 27 to count.

The output of axis integrator 13 is connected to a position error register 31 which is also an up/down counter. The axis rate command from axis integrator 13 generates the command to the servo motor 63 by causing the position error register 31 to count.

The resultant of the motion commanded along the x and y axes is the square root of the sum of the squares of the outputs of the axis digital integrators 11 and 13. The output of the axis integrators 11 and 13 are position command rates which consist of position change commands per unit of time. Each axis integrator generates a command rate proportional to the sine or cosine of the total distance to be traveled along each axis. Therefore command rates for the total distance to be traveled along each axis are such that the total number of command pulses to be generated by the x axis integrator 11 and y axis integrator 13 are completed at the same time.

The resultant of the length of movement commanded = [(output of axis integrator 11)$^2$+(output axis integrator 13)$^2$]$^{\frac{1}{2}}$, wherein output of axis integrator 11 =

$$\frac{\text{(iterate rate) (X integrand)}}{\text{modulus}}$$

and output of axis integrand 13 =

$$\frac{\text{(iterate rate) (Y integrand)}}{\text{modulus}},$$

substituting for the outputs of the axis integrators into this resultant of the length of movement commanded equation, we get resultant of the length of movement commanded =

$$\left\{ \left[ \frac{\text{(iterate rate) (X integrand)}}{\text{modulus}} \right]^2 + \left[ \frac{\text{(iterate rate) (Y integrand)}}{\text{modulus}} \right]^2 \right\}^{\frac{1}{2}}$$

The modulus of the axis integrators 11 and 13 and the resultant length of movement of integrator 15 are all equal. The iterate rate of the axis integrators 11 and 13 and the resultant length of movement integrator 15 are all equal. The total output of each of the axis integrators 11 and 13 are limited by the total X distance to go counter 23 and the total Y distance to go counter 25, respectively.

Rearranging terms in the previous equation we get the resultant of the length of movement=

$$\text{iterate rate}\left[\frac{(X \text{ integrand})^2 + (Y \text{ integrand})^2}{\text{modulus}}\right]^{\frac{1}{2}}.$$

By setting the integrand of the resultant length of movement integrator 15 to a predetermined value, namely, the $[(X \text{ integrand})^2+(Y \text{ integrand})^2]^{\frac{1}{2}}$, the output of the resultant length of movement integrator 15 will be equal to the resultant of the position change commands generated by the axis integrators 11 and 13 along the resultant path. An increment preset register 35 has loaded into it the incremental distance along the resultant between operating positions, which is less than the resultant of the total X and total Y distances. This incremental value is then loaded into an increment counter 33. The output of the resultant integrator 15 counts down the increment counter 33 to zero. When the count in increment counter 33 is zero, an increment zero check 37 provides a low input to AND gate 10 thereby disabling the gate and stopping the iterate command from reaching the function generator 17 and the resultant length of movement integrator 15.

After the machine operation has been performed, the content of the incremental present register 35 is again loaded into the increment counter 33 and the operation is repeated until the total X and Y distances have been reached as indicated by the respective counters 23 and 25.

The resolution with which the incremental distance along the resultant path can be represented by the output of the resultant length of movement integrator 15 is equal to the resolution with which the motion along the x and y axes can be commanded.

Position error register 27 which has hereinabove been only partially described is made to count by the output command pulses of the axis integrator 11 and the output thereof is connected to a digital-to-analog converter 41. The output analog signal of the digital-to-analog converter 41 is connected to the input of a servo amplifier 43. The output of the servo amplifier 43 powers a servo motor 45. The output shaft of the servo motor 45 drives the controlled member along the x axis 47. Mechanically coupled to the servo motor 45 is a tachometer 51 and a resolver 53. The output from the tachometer 51 forms a negative feedback loop to the servo amplifier 43. The output from the resolver 53 is fed into a waveshaper and digitizer 55. The digital output of the waveshaper and digitizer 55 provides negative feedback to the position error register 27.

Similarly, position error register 31 which is made to count by output command pulses from axis integrator 13 provides a signal to a digital-to-analog converter 57. The output of digital-to-analog converter 57 is fed into a servo amplifier 61 which powers a servo motor 63. The output shaft of the servo motor 63 drives the control member along the y axis 65. Mechanically coupled to the servo motor 63 are a tachometer 67 and a resolver 71. The output of the tachometer 67 forms a negative feedback loop providing an input to the servo amplifier. The output of resolver 71 is connected to a waveshaper and digitizer 73. The digital output of waveshaper and digitizer 73 provides negative feedback to position error register 31.

Figure 3:
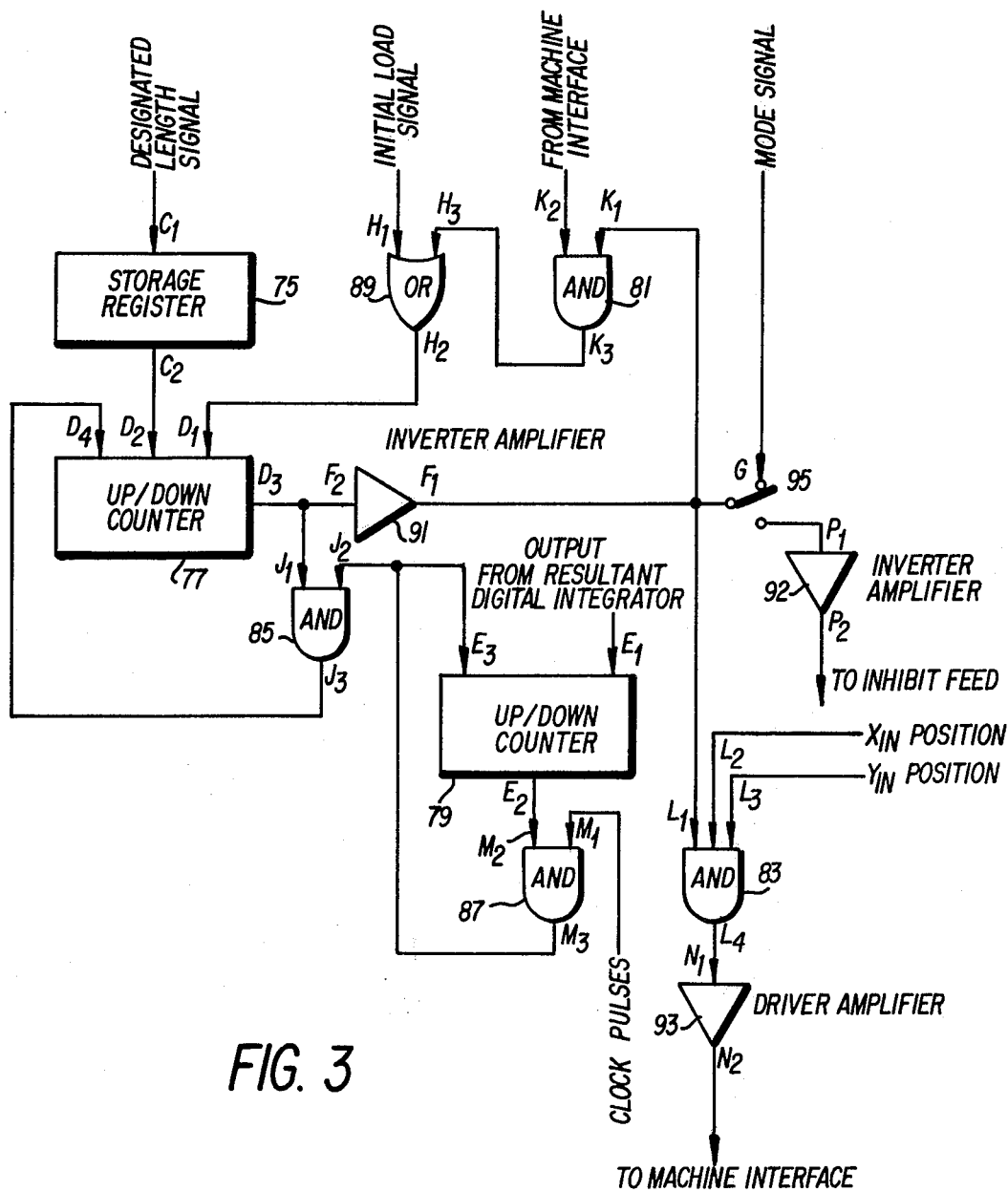
FIG. 3 is a block diagram illustrating in more detail a manner in which a portion of the block diagram in FIG. 2 can be implemented for determining when the desired length of movement of a controlled member along a path of repeated operating positions has been reached.

FIG. 3 illustrates in greater detail a previously known way of accomplishing the functions and cooperation of increment preset 35, increment counter 33 and increment zero check 37. For purposes of facilitating description of operation, let it be assumed that the control member is a table of a machine tool containing a workpiece which is to move along a path between repeated operating positions where punching, for example, is to take place. In such a case it is desired the table be moved a specified distance after one punch is made in order that another punch can be made and so on. This type of repeated punching results in the nibbling form of operation.

As shown in FIG. 3, the circuit for controlling the length of movement of the table between punches (or nibbles) is provided by a cooperative arrangement of components comprising a storage register 75, up/down counters 77 and 79, AND gates 81, 83, 85 and 87, OR gate 89, inverter amplifiers 91 and 92, a driver amplifier 93 and a unidirectional controlled switch 95, all of which can be standard circuit blocks and components. More specifically, storage register 75 stores a weighted digital signal (such as a binary coded decimal signal) indicative of the desired length of movement of the table between center points of operating positions. This weighted digital signal is received at an input terminal $C_1$ of storage register from a suitable programmed data source, such as a punched tape. Up/down counter 77 provides a means for receiving at its input terminal $D_2$ the above-mentioned weighted digital signal in parallel from output terminal $C_2$ of storage register 75. Up/down counter 79 receives incremental pulses, wherein each pulse provides an indication of an increment of commanded movement of the controlled member of a desired resultant path. These pulses are received at an input terminal $E_1$ of counter 79 from the output of the resultant length of movement digital integrator 15 shown in FIG. 2.

As will be explained more fully hereinafter, AND gates 85 and 87 provide a means of incrementally subtracting the pulses within counter 79 from counter 77 until the weighted digital signal within counter 77 is reduced to a designated minimum value, which in this instance is zero. Amplifier 91 serves as a means for generating a control signal at its output terminal $F_1$, which control signal can be used for inhibiting further generation of pulses when the weighted signal within counter 77 has been reduced to its designated minimum value which, as noted above, is zero, to thereby signify that within the numerical control system the operating position has been reached. This control signal is applied to inhibit further generation of an iterate command, which would, in turn, prevent further generation of pulses at the output of the resultant length of movement digital integrator 15 of FIG. 2. AND gate 83 and amplifier 93 cooperate to provide a means for generating a digital signal to enable the punching operation to begin when both the signal within counter 77 is reduced to zero and the workpiece has completed its move along the incremental length of the path.

Still referring to FIG. 3 the operation of the circuit will now be described in greater detail. When the above-referenced punching operation at repeated operating positions is to be performed, a programmed signal, which can be from a tape, and which is indicative of the desired length of movement that the table should traverse between repeated operating positions, is received at input terminal $C_1$ of register 75 and stored therein. At substantially the same time, the programmed signal from the tape can provide a mode control signal to the control terminal G of control switch 95, to cause the switch to close so as to connect the circuit output to an inverter amplifier 91 with the inverted output connected to an input and AND gate 10 of FIG. 2. Subsequent thereto, a short duration initial load signal, which can also be derived from the programmed taped source, is applied to an input terminal $H_1$ of OR gate 89 and is transmitted from an output terminal $H_2$ of the OR gate to an input load terminal $D_1$. The weighted digital signal within register 75 is transmitted from its output terminal $C_2$ and is loaded in parallel into up/down counter 77 via input terminal $D_2$. As long as the count within counter 77 is greater than zero, an output signal level will be present at its output terminal $D_3$. This signal from terminal $D_3$ is transmitted to an input terminal $J_1$ of AND gate 85, thus enabling that AND gate, and is also applied to input terminal $F_2$ of amplifier 91. The inverted signal at output terminal $F_1$ of amplifier 91 is applied to input terminals $K_1$ and $L_1$ of respective AND gates 81 and 83, thereby disabling these AND gates. This output from $F_1$ is applied to input terminal $P_1$ of inverter amplifier 92. The output terminal $P_2$ of inverter amplifier 92 is connected to input AND gate 10 of FIG. 2, and does not inhibit the generation of iterate commands and thus does not adversely affect the generation of incremental pules at the output of the resultant length of movement integrator 15 of FIG. 2. The generated resultant pulses will be received at input terminal $E_1$ of up/down counter 79. Simultaneously, clock pulses are continuously received from clock 8 in FIG. 2 at an input terminal $M_1$ of AND gate 87 in FIG. 3. The repetition rate of these clock pulses is at a significantly higher rate than would be the frequency at which the incremental pulses are generally received at input terminal $E_1$ of counter 79. Thus, generally as soon as an incremental pulse is received at counter 79, an enabling voltage is applied from an output terminal $E_2$ of counter 79 to an input terminal $M_2$ of AND gate 87. When the next immediate clock pulse is received at input terminal $M_1$ of AND gate 87, a discharge pulse is generated at output terminal $M_3$ of AND gate 87 and is applied to a count down terminal $E_3$ of counter 79 to reduce the count within the counter by one. Simultaneously, this pulse is applied to an input terminal $J_2$ of AND gate 85, and since at this time, an enabling voltage is applied at input terminal $J_1$ of AND gate 85, a subtracting pulse is generated at an output terminal $J_3$ of AND gate 85 which is transmitted to a countdown terminal $D_4$ of counter 77, so as to reduce the count within counter 77 by an incremental value, which in this instance is one. This process continues, and subtracting pulses are generated at output terminal $J_3$ of AND gate 85, whenever incremental pulses have been received by counter 79, to continuously incrementally count down counter 77 until the count within counter 77 is reduced to zero. As soon as the count within counter 77 is reduced to zero, the voltage level at output terminals $D_3$ of counter 77 falls to zero and AND gate 85 is disabled. At the same time, the output voltage from inverter amplifier 91 rises to a level which provides an enabling voltage at input terminals $K_1$ and $L_1$ of respective AND gates 81 and 83. Similarly, this voltage level is used as a control signal, which when inverted in inverter amplifier 92 and applied to the AND gate 10 of FIG. 2, causes the iterate command signal to be disabled, thereby preventing further generation of pulses at the output of resultant length of movement integrator 15 of FIG. 2, and also signifying to the numerical control system the end of the desired commanded length of movement of the table. At the same time, this causes output terminal $E_2$ of counter 79 to remain at a zero value once it has been incrementally counted down to zero, and AND gate 87 is disabled. Concurrently, and inasmuch as, the iterate command of the manual feed rate override integrator 9 is disabled, commanded movement signals can not be applied to X and Y position error registers 27 and 31 of FIG. 2. Therefore, as soon as the table completes its move to the end of a predetermined path, the output signals from the respective X and Y position error detectors 27 and 31 shown in FIG. 2, are reduced to zero and thus disable the servo motors 45 and 63 and prevent further movement of the table. Accordingly, once the control member has actually reached its operating position, and the X and Y position errors are less than a specified value, output signals are produced ($X_{in}$ POSITION and $Y_{in}$ POSITION, respectively), which are applied to respective input terminals $L_2$ and $L_3$ of AND gate 83. The $X_{in}$ POSITION and $Y_{in}$ POSITION signals enable an output signal to be generated at output terminal $L_4$ of AND gate 83, which, in turn, is applied to an input terminal $N_1$ of driver amplifier 93 so that an input signal is generated at output terminal $N_2$ of the amplifier. This signal at the output terminal $N_2$ is then transmitted to a machine interface for effectively notifying the machine that the operating position has been reached, and the actual punching operation can now begin. As soon as the punching operation has been completed, the machine provides a momentary enabling interface signal to input terminal $A_2$ of AND gate 81, thereby causing generation of an enabling pulse at output terminal $K_3$ of AND gate 81 which is transmitted through an input terminal $H_3$ of OR gate 89 and out through terminal $H_2$ of the OR gate to the load input terminal $D_2$ of counter 77. The momentary application of the signal at load input terminal $D_2$ enables the stored weighted digital signal within storage register 75 to be transmitted in parallel again to counter 77, and the controlling length of movement between operating positions function is again repeated. This process continues until either (1) the total X and Y distance counters 23 and 25 of FIG. 2 go to zero, or (2) the mode signal is removed from control terminal G of control switch 95 of FIG. 3 by opening the control switch. The weighted digital signal (not shown) stored within the storage register 75 is cleared by applying a reset signal to the register.

The operation of the disclosed invention will now be described with particular reference to the performance of the nibbling function. Referring to FIG. 2, an operator of the numerical control system would initially set the integrand value of the MFO integrator 9 to control the rate at which the function generator 17 generates position change pulses, which in turn would determine the rate at which the x and y axis of the controlled member, which in this case would be the table of the punch press with work piece affixed to it, would move. If, for example, nibbling were to be performed along the 5 inch hypotenuse of a right triangle having 3 inch and 4 inch sides, where the three inch side lies along the X axis and the four inch side lies along the Y axis, information encoded on a punch tape would set the integrand of the axis integrator 11 to three inches, the integrand of the axis integrator 13 to four inches and the integrand of the resultant integrator 15 to the square root of the sum of the squares of the initial integrand of the axis integrators 11 and 13, or five inches. Additionally, the total X distance counter 23 would be set to three inches and the total Y distance counter 25 would be set to four inches.

If a punch is to occur every 0.1 inches, then the increment preset register 35 would be set to 0.1 inches. The value in the increment preset register 35 is transferred to the increment counter 33. The value in the increment zero check 37 would be 0.1 inches and AND gate 10 would be enabled. By suitable means the table would be moved to an initial starting position.

The pulse rate of clock 8 is multiplied by a value less than or equal to 1 depending on the value of the ingrand of MFO integrator 9. The iterate command is available at the output of the AND gate 10 and is simultaneously available to the two axis integrators 11 and 13 and the resultant length of movement integrator 15. As a result of the differing integrand values of the axis integrators, the output rate of axis integrator 11 compared to the output rate of axis integrator 13 will be in the ratio of 3 to 4. When axis integrator 11 has generated position change pulses representing a distance of 0.06 inches along the X axis and axis integrator 13 has generated position change pulses representing 0.08 inches, resultant length of movement integrator 15, because its integrand is set to the square root of the sum of the squares of the integrands of the axis integrators 11 and 13, will have generated output position change pulses representing 0.1 inch. The output of axis integrator 11 counts down total X distance counter 23 and counts up position error register 27. Axis integrator 13 counts down total Y distance counter 25 and counts up position error register 31. The output of resultant length of movement integrator 15 which also could be called a nibble increment integrator counts down increment counter 33. When the X axis has been commanded to move 0.06 inches and the Y axis has been commanded to move 0.08 inches, the increment counter 33 has been counted to zero by the output of resultant length of movement integrator 15. Increment zero check register 37 outputs a zero signal disabling AND gate 10 and stopping the iterate command from reaching the function generator 17 and the resultant length of movement integrator 15.

When sufficient pulses have been issued by the axes integrators 11 and 13, the servomotors 45 and 63 will move the axes of the controlled member (table with work piece attached) to the first operating position. Additionally when the table has stopped moving, which is indicated by position error register 27 and 31 going to zero, the punch operation can be performed. After the punch operation is completed, the weighted digital signal for increment preset register 35 can again be loaded into increment counter 33.

After the total X distance counter 23 and the total Y distance counter 25 have both gone to zero, the iterate command also will be stopped since the five inch distance along the hypotenuse of the three inch four inch five inch right triangle has been traversed.

The nibbling increment should desirably be adjusted in order that the final punch will be full or nearly full with respect to the nibble bite to avoid punch loading problems. Once the nibbling increment has been chosen, the resolution with which the incremental distance can be measured will be equal to the resolution with which movement along the x and y axes can be commanded.

While the function generator has been shown to command motion along two axes, it will be understood from the foregoing that the invention can be used with thread cutting or inch per revolution programming, for example, with three axes of movement. A function generator which solves other differential equations can also be used. When variable modulus integrators are used so that the rate of movement of the control member can be changed, the same modulus must be used for the resultant length of movement integrator 15 as is used for the axis integrators 11 and 13 to keep the output rate of the resultant length of movement integrator 15 equal to the resultant path commanded by the axis integrators 11 and 13.

Although this invention has been described with reference to a specific embodiment thereof, the foregoing will suggest numerous modifications which are possible without departing from the invention. Accordingly it is desired to cover all modifications within the spirit and scope of this invention.

What is claimed as new and desired to be secured by Letters Patent of the United States is:

1. An apparatus for controlling the length of movement of a controlled member along a path of repeated operating positions which comprises:
   clock means for providing iterate commands;
   a function generator comprising an axis digital integrator with a predetermined initial integrand for each axis of movement of the controlled member, said digital integrator being responsive to an iterate command from said clock means and effective for generating axis position change command pulses;
   means for controlling the movement of the controlled member along each axis thereof in response to said axis position change command pulses;
   a resultant length of movement digital integrator responsive to an iterate command from said clock means and having an integrand equal to the square root of the sum of the squares of said predetermined initial integrands of said axis digital integrators;
   means for determining when the output of said resultant length of movement digital integrator is indicative of the required distance between repeated operating positions; and
   means for generating a control signal effective to disconnect said iterate command generated by said clock means from said axis and resultant length of movement digital integrators when the incremental distance of the controlled member between repeated operating positions has been reached.

2. An apparatus according to claim 1, wherein said function generator comprises a plurality of axis digital integrators each with a predetermined initial integrand for a respective one of a plurality of axes of movement of the controlled member, and each said digital integrator is responsive to an iterate command from said clock means and is effective for generating axis position change command pulses.

3. An apparatus according to claim 1, further comprising:
   means for storing a predetermined initial integrand indicative of the total distance commanded along an axis and responsive to respective axis position change command pulses, to determine when the total distance along each respective axis has been traveled.

4. Apparatus for controlling the length of movement of a controlled member along a path of repeated operating positions each spaced an incremental distance from an immediately preceding operating position which comprises:

clock means for providing iterate commands;

a function generator comprising an axis digital integrator with a predetermined initial integrand for each axis of movement of the controlled member, said digital integrator being responsive to an iterate command from said clock means and effective for generating axis position change command pulses;

means for providing motion along each axis of the controlled member in response to respective axis position change command pulses;

a resultant length of movement digital integrator responsive to an iterate command from said clock means and having an integrand equal to the square root of the sum of the squares of said initial integrands of said axis digital integrators for developing a resultant of all said axis position change command pulses to the axes of the controlled member;

means for determining when said resultant from said resultant length of movement integrator is indicative of the incremental distance between repeated operating positions;

means for generating a controlled signal effective to disconnect said iterate command generated by said clock means from all said axis and resultant length of movement digital integrators when the incremental distance of the controlled member between repeated operating positions has been reached; and means for disconnecting said iterate command from all said axes and resultant length of movement digital integrators when a predetermined total number of axis position change command pulses have been generated by each of said axis digital integrators.

5. Apparatus according to claim 4, wherein said function generator comprises a plurality of axis digital integrators each with a predetermined initial integrand for a respective one of a plurality of axes of movement of the controlled member, and each said digital integrator is responsive to an iterate command from said clock means and is effective for generating axis position change command pulses.

6. Appparatus according to claim 5, wherein said means for providing motion along each axis of the controlled member in response to respective axis position change command pulses comprises:

a position error register with an additive input, a subtractive input, and an output indicative of the number in the register, and with said additive input coupled to the ouput of the respective axis digital integrator;

means responsive to the number in said position error register for positioning said controlled member along each controlled axis; and means for generating pulses indicative of the actual position of the controlled member coupled to the subtractive input of the position error register.

7. Apparatus according to claim 6, wherein said position error register comprises an up/down counter.

8. Apparatus according to claim 5, wherein said means for determining when said resultant from said resultant length of movement integrator is indicative of the incremental distance between repeated operating positions comprises:

means for receiving a weighted digital signal indicative of the desired length of movement of the controlled member between said repeated operating positions;

means for receiving pulses from said resultant digital integrator; and means for incrementally subtracting said pulses received from said resultant digital integrator from the weighted digital signal within said means for receiving the weighted digital signal until the weighted signal therein is reduced to a predetermined minimum value.

9. Apparatus according to claim 8, further comprising;

means for storing the weighted digital signal;

means for initially transmitting the weighted digital signal from said storing means to said digital signal receiving means before the controlled member begins to move between said repeated operating positions;

means for subsequently transmitting the weighted digital signal from said storing means to said digital signal receiving means after the controlled member has completed its move to its operating position and the operation at the operating position is completed; and means for generating a signal to enable the operation to begin when the weighted signal within said digital signal receiving means is reduced to its designated minimum value and the controlled member has completed its move along the path to its operating position.

10. Apparatus for controlling a punch press to perform contour nibbling operations comprising:

a clock means for providing iterate commands;

a function generator comprising an axis digital integrator with a predetermined initial integrand for each axis of movement of the punch press, each digital integrator being responsive to an iterate command from said clock means and effective for generating axis position change command pulses;

means for providing motion along each axis of the controlled member in response to respective axis position change command pulses;

a nibble increment digital integrator responsive to an iterate command from said clock means and having an integrand equal to the square root of the sum of the squares of said initial integrands of said axis digital integrators for developing the resultant of all said axis position change command pulses to the axes of the controlled member;

means for determining when said resultant of said nibble increment integrator is indicative of the required distance between punches;

means for generating a controlled signal effective to disconnect said iterate command generator by said clock means from all said axis and nibble increment digital integrators when the distance between punches has been reached; and means for disconnecting said iterate command from all said axes and nibble increment digital integrators when a predetermined total number of axis position change command pulses have been generated by each of said axis digital integrators.

* * * * *